(12) United States Patent
Lenzen et al.

(10) Patent No.: US 7,013,547 B2
(45) Date of Patent: Mar. 21, 2006

(54) METHOD AND DEVICE FOR THE PRODUCTION OF CURVED SPRING STRIP SECTIONS

(75) Inventors: Oliver Lenzen, Sachsenheim (DE); Gerald Pachur, Hessigheim (DE)

(73) Assignee: Valeo Systemes d'Essuyage, (FR)

( * ) Notice: Subject to any disclaimer, the term of this patent is extended or adjusted under 35 U.S.C. 154(b) by 246 days.

(21) Appl. No.: 10/474,775

(22) PCT Filed: Apr. 11, 2002

(86) PCT No.: PCT/EP02/04024

§ 371 (c)(1),
(2), (4) Date: Oct. 14, 2003

(87) PCT Pub. No.: WO02/085550

PCT Pub. Date: Oct. 31, 2002

(65) Prior Publication Data

US 2004/0159994 A1 Aug. 19, 2004

(30) Foreign Application Priority Data

Apr. 24, 2001 (DE) .............................. 101 20 050

(51) Int. Cl.
*B23P 17/00* (2006.01)

(52) U.S. Cl. .................... 29/417; 29/428; 29/819; 72/6.2; 72/129; 72/199; 72/365.2; 72/366.2; 72/164; 72/166

(58) Field of Classification Search .............. 29/417, 29/428, 819; 15/250.001; 72/6.2, 12.8, 72/28.2, 95, 129, 199, 337, 365.2, 366.2, 72/372, 124, 160, 162, 164, 166, 379.2

See application file for complete search history.

(56) References Cited

U.S. PATENT DOCUMENTS

| | | | | |
|---|---|---|---|---|
| 2,920,678 A | * | 1/1960 | Cunningham et al. | ........ 72/164 |
| 3,192,551 A | | 7/1965 | Appel | |
| 3,394,574 A | * | 7/1968 | Tadeusz et al. | ............... 72/205 |
| 3,777,532 A | * | 12/1973 | Noe | ............................ 72/205 |
| 4,528,830 A | * | 7/1985 | Masui et al. | ................. 72/11.7 |
| 4,711,109 A | * | 12/1987 | Rohde et al. | ................. 72/11.7 |
| 4,782,683 A | * | 11/1988 | Tippins et al. | ................ 72/229 |
| 5,111,677 A | * | 5/1992 | Del Fabro et al. | ............ 72/164 |

(Continued)

FOREIGN PATENT DOCUMENTS

DE  458 563  3/1928

(Continued)

OTHER PUBLICATIONS

Thomas Neff, *Roller Straightening Machines—Topology and Charateristic Features*; Strips, Sheets, Pipes, Jun. 1976, pp 223-226.

(Continued)

*Primary Examiner*—Jermie E. Cozart
(74) *Attorney, Agent, or Firm*—Young & Basile, P.C.

(57) ABSTRACT

A method and a device for the production of curved spring strip sections. A spring strip runs through a bending unit formed from three separate support points and a reverse bending unit, arranged in series, and formed from a fourth support point. Bent and reverse-bent spring strip sections are separated off from the spring strip in a separator unit. In order to achieve a compact construction for the device, the third support point of the bending unit and the fourth support point of the reverse bending unit are adjustable in position relative to the spring strip, by a controller with pre-set programs.

7 Claims, 1 Drawing Sheet

U.S. PATENT DOCUMENTS

| | | | |
|---|---|---|---|
| 5,197,179 A | * | 3/1993 | Sendzimir et al. ......... 29/527.4 |
| 5,687,595 A | * | 11/1997 | Noe et al. ..................... 72/8.3 |
| 2002/0116973 A1 | * | 8/2002 | Wilhelm et al. .............. 72/166 |

FOREIGN PATENT DOCUMENTS

| | | | |
|---|---|---|---|
| DE | 38 15 304 | | 11/1989 |
| DE | 195 03 850 | | 8/1996 |
| JP | 03285720 A | * | 12/1991 |
| WO | WO 94/17932 | | 8/1994 |
| WO | WO 99/51375 | | 10/1999 |
| WO | WO 99/52753 | | 10/1999 |
| WO | WO 01/62408 | | 8/2001 |

OTHER PUBLICATIONS

Handbook of Manufacturing Equipment, vol. 2/3, *Forming and Shearing*, pp 1288, Carl Hanser Verlag, Munich, Vienna 1985.

Faculty of Mechanical Engineering at the University of Karlsruhe by Werner Klein, 1979, *Mechanical and Radiographic Studies on the Characteristics of Unalloyed Steels at Room Temperature*.

* cited by examiner

METHOD AND DEVICE FOR THE PRODUCTION OF CURVED SPRING STRIP SECTIONS

BACKGROUND

The present invention relates to a method and a device for the production of curved spring strip sections, specifically having a variable material thickness over their trimmed length.

A method and a device of the kind described above are known from WO 99/51375. In the known method, a spring strip composed of the spring strip sections disposed sequentially to form one piece is bent between three support points spaced apart in the direction of spring strip travel and impinging alternately in sequence on one of the two sides of the strip and then reverse-bent in the opposite direction in a subsequent fourth support point by a lesser degree of curvature. The spring strip section so treated is then detached from the spring strip. The second of the three support points for bending the spring strip and the fourth support point for reverse bending the spring strip are both configured to be adjustable perpendicular to the spring strip in the direction of strip thickness. The perpendicular adjustments of the adjustable support points are controlled relative to the spring strip in accordance with predetermined programs, which take account of the changing material thickness within the spring strip sections in the direction of spring strip travel. A spring strip section produced with the help of this method is characterized by high dimensional stability. Furthermore, the method permits a continuous bending process in a single step, corresponding to one pass through the support points.

The known device has a bending unit consisting of three spaced apart support points, through which a spring strip composed of the spring strip sections disposed behind one another to form one piece can be passed in such a way that the three support points impinge on the one and the other side of the strip sequentially and alternately in the direction of spring strip travel. The second of the three support points is configured to be adjustable perpendicular to the spring strip to set a radius of curvature. Furthermore, the known device has a reverse bending unit positioned after the bending unit in the direction of spring strip travel. The reverse bending unit comprises a fourth support point acting upon the same side of the spring strip as the second of the three support points. This fourth support point is adjustable perpendicular to the spring strip to set a reverse radius of curvature. Finally, the known device possesses a cutting unit to detach the spring strip section from the spring strip after it has passed through the bending unit and the reverse bending unit.

Bent spring strip sections which are produced by means of such methods and devices are used, for example, in beam blade windshield wipers, which are known from U.S. Pat. No. 3,192,551. With a beam blade windshield wiper of this type, the spring strip section, on whose center the particular windshield wiper arm acts, exerts almost even downward force on the wiping element, which is secured at the back, against the generally curved surface of the windshield over the entire wiped area. The thickness of the material of the spring strip section employed therein changes over its length, being at its maximum in the middle of the spine and decreasing toward the two ends of the spine.

To produce beam blade windshield wipers of this type, it is known from WO 99/52753 to conjoin the curved spring strip section to a flexible rubber wiping element and to attach a connecting device for a wiper arm.

The known procedure, or the known device respectively, for producing curved spring strip sections demands a relatively complex construction and relatively great expense if the lever arms operant in the bending process and/or in the reverse bending process are to be altered. These disadvantages are to be overcome with the present invention.

From DE-PS 458 563 it is known to process a spring strip composed of spring strip sections disposed sequentially to form one piece in a machining station with a punch and stamping tool. After processing, the spring strip sections so treated are detached from the spring strip.

From WO 94/17932 both a method and a device are known to produce spring strip sections having varying material thickness. A spring strip of constant thickness and width is pulled through a pair of oppositely located rollers, where the spacing of the rollers is varied by a control device to form the particular spring strip sections with a varying thickness along their length.

From DE-OS 38 15 304 a method and a device are known for bending or straightening profile steel and strips using cylinders or rollers. Here too, the support points, namely the cylinders or rollers, are staggered alternately on both sides of the strip to be shaped, where a staggered arrangement is understood to mean that the support points are positioned offset to one another, alternately, and in sequence on the one or the other side of the strip. All the support points are adjustable individually perpendicular to the strip in the direction of strip thickness. It has been shown that the strips produced in this way have far less, if any, residual stresses. Continuous bending operation can also be implemented.

In DE-OS 38 15 304 already mentioned, a straightening process is described in addition to a bending process, where straightening differs from bending in that straightening consists to a certain degree in a double application of the bending process described, wherein the second bending is performed in counter-phase to the first bending, so that bending from the particular plane of reference in one direction is followed by bending from the plane of reference in the other direction by additional support points. Accordingly, the support points in straightening are also adjusted perpendicular to the strip in the direction of strip thickness to achieve counter-phased deflections.

The device for straightening known from the above described DE-OS 38 15 304 differs from the one for bending in that the support points are arranged in such a way that straightening can take place by bending two times in opposite directions to the reference plane, so that in principle the device can be used for both bending and straightening. Depending on the required accuracy of the radii of curvature, reverse bends are made.

It is pointed out in this document (DE-OS 38 15 304) that straightening is generally performed in practice by cold-forming in order to bring bent or distorted work pieces to the desire geometric shape, but there are no indications to the effect that a desired geometric shape could mean a shape deviating from a non-curved or unbent shape. Straightening is generally understood to mean a bending process in which the straightened end product has a quasi-infinite radius of curvature and thus possesses maximum straightness, or minimal residual curvature. Accordingly, straightening is a subform of bending with successive, opposite deformations with decreasing radius of curvature (see for example, Thomas Neff, "Roller Straightening Machines—Typology and Characteristic Features," in "Strips, Sheets, Pipes" 6–1976, pp 223–226). The same can be found in the Handbook of Manufacturing Equipment, Vol 2/3 "Forming and Shearing,"

page 1288, Carl Hanser Verlag, Munich, Vienna, 1985, where roller straightening is presented as a subform of roller bending.

To be sure it is basically known from the above-cited essay by Thomas Neff that roller-straightening machines with restricted parallel straightening space can be used to create predetermined curvatures, i.e., as bending machines (see page 225, section 3.1.1) so that a curved shape can be produced by bending and subsequent lesser reverse bending, but there is no express indication that this can be achieved with individually adjustable support points.

A straightening device is known from DE 195 03 850 C1 in which individual straightening rollers or straightening rollers assembled in groups are adjustable to achieve a desired degree of straightening, where the adjustment is made depending on a downstream analysis device. The intention here is to straighten strip material; the production of bent strip sections is not explained.

From the dissertation for the Faculty of Mechanical Engineering at the University of Karlsruhe by Werner Klein from 1979, entitled "Mechanical and Radiographic Studies on the Characteristics of Unalloyed Steels at Room Temperature," it is known that with reverse bending deformation the inhomogeneous condition of residual stress is alleviated after even minor reverse deformation (see page 97). This dissertation also deals with bending deformation with subsequent minor reverse deformation which is performed in conjunction with straightening. In the case of the present invention, however, curved spring steel sections are to be produced with a desired, geometric shape and not straightened spring steel sections.

SUMMARY

The present invention deals with the problem of developing a method of the type described above such that it results in simplified construction for the pertinent device.

This problem is solved under the invention by a method having the features of claim 1 as well as by a device having the features of claim 5.

The invention is based on the general idea of making the third of the three support points for spring strip bending closest to the fourth support point for spring strip reverse bending adjustable perpendicular to the spring strip in the direction of strip thickness. This construction allows the last two support points to be adjustable without an additional, non-adjustable support point being located therebetween. This results in a reverse arrangement for the third support point for spring strip bending and for the fourth support point for spring strip reverse bending, permitting a compact structure since the distance between the adjustable support points can be made considerably smaller. This is of particular advantage if additional process steps with subsequent machining are to be added downstream to the method as envisaged by the invention.

Moreover, the arrangement of the adjustable support points as envisaged by the invention permits the adjustment of the lever arms operant in the bending and the reverse bending process to be considerably simplified. In the case of the invention, only the last two support points have to be positioned in the direction of spring strip travel, while in the case of an arrangement having a fixed support point positioned between the adjustable support points, this fixed support point has to be adjusted in the direction of spring strip travel (c.f. WO 99/51375). In this respect, the invention also permits the device to be especially compact in construction.

A particular advantage of the inventive method is seen in the fact that the cutting of the spring strip sections can be completely separated from the bending and reverse bending processes. In particular, individual process parameters can be optimized independently of one another, whereby the overall process is simpler and can be better optimized.

Furthermore, the two process steps of bending and reverse bending can be coordinated more simply, since no intervening, fixed support point has to be taken into consideration.

Overall, the present invention can yield decisive advantages in the volume production of curved spring strip sections, which has a positive effect on production costs.

In accordance with a particularly advantageous aspect of the method under the invention, the detached spring strip section can be conjoined to a flexible rubber wiping element in a further process step, wherein a connecting device for a wiper arm is attached. Particularly inexpensive beam blade windshield wipers with an integral, curved spring strip section can be produced in this way.

Additional important features and advantages of the invention can be found in the dependent claims, in the drawings and in the pertinent description of the figures with reference to the drawings.

It is understood that the features described above and those to be described in what follows can be used not only in the particular cited combination; but also in other combinations or independently without departing from the scope of the present invention.

BRIEF DESCRIPTION OF THE DRAWING

A preferred aspect of the invention is shown in the drawing and is described in greater detail in the description which follows.

The single

DETAILED DESCRIPTION

Figure 1:
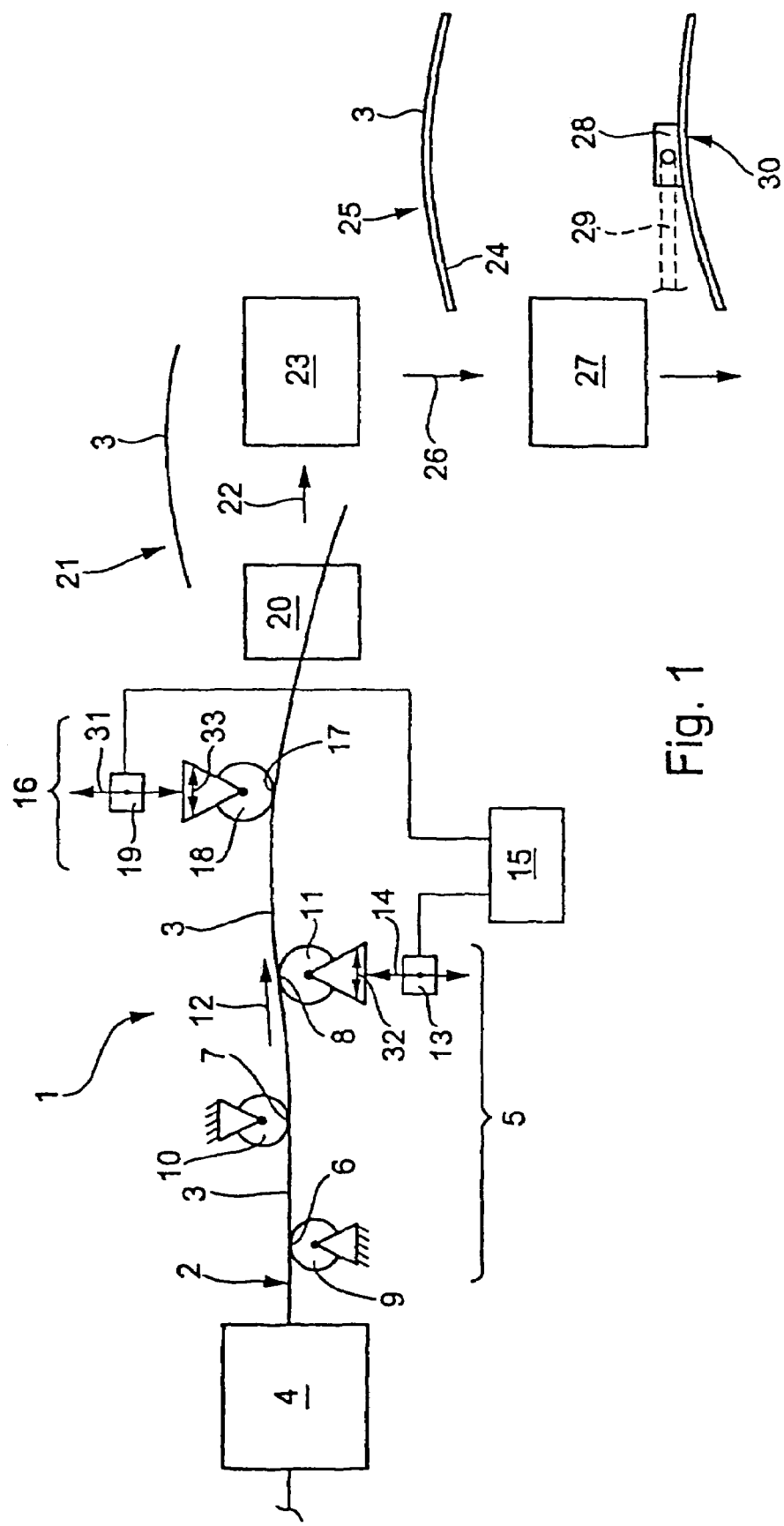
FIG. 1 shows a highly simplified schematic representation of a device under the invention to produce curved spring strip sections.

In accordance with FIG. 1, a spring strip 2 composed of spring strip sections 3 disposed sequentially to form one piece is fed to a device in accordance with the invention 1. The spring strip 2 is fed from a spool, not shown here, almost as an endless strip. Before it passes into the device 1, the spring strip 2 can pass through a straightening station 4 in which conventional vertical and/or horizontal straightening of the spring strip 2 is performed.

The device 1 has a bending unit 5, identified by a curved bracket, with three support points, a first support point 6, a second support point 7 and a third support point 8. Each of the three support points 6 to 8 is implemented here as rollers or cylinders 9, 10 and 11. The three support points 6 to 8 are spaced apart in a direction of spring strip travel 12 represented by an arrow and are positioned sequentially, alternately impinging on one of the two sides of the spring strip 2. While the first support point 6 and the second support point 7 are configured as stationary support points, the third support point 8 is designed as an adjustable support point. To this end, the appropriate cylinder 11 can be adjusted perpendicular to the spring strip 2 in the direction of strip thickness by means of a suitable actuator 13. This adjusting motion lies in the plane of the drawing and is represented by a double arrow 14. The actuator 13 is operated by a control unit 15, in which suitable programs are run to control the third support point 8.

Referenced to the direction of spring strip travel 12, a reverse bending unit 16, also represented by a curved bracket, is provided after the bending unit 5, said bending unit having a fourth support point 17. This fourth support point 17 is also formed by a cylinder or roller 18 which can be adjusted perpendicular to the spring strip 2 in the direction of strip thickness by means of an actuator 19. This actuator 19 is also operated by the control unit 15.

The adjustability of the fourth support point 17 which lies in the plane of the drawing is indicated in FIG. 1 by a double arrow 31.

Referenced to the direction of spring strip travel 12, a cutting unit 20 is located subsequent to the reverse bending unit, in which the bent and reverse-bent spring strip section 3 is detached from the spring strip 2. To this end, the cutting unit 20 has a suitable cutting edge which interacts with a suitable blade. After cutting, the result is a detached, curved spring strip section 3 which is shown symbolically in FIG. 1 and identified in general as reference number 21.

In accordance with an arrow 22, the detached, curved spring strip section 21 is taken after the cutting unit 20 to a joining station 23 in which the separated and curved spring strip section 21 is conjoined to a flexible rubber wiping element 24. The curved spring strip section 3 now fitted with the wiping element 24 is identified in FIG. 1 as reference number 25 and, as shown by an arrow 26, is taken to an attaching station 27 in which a connecting device 28 is attached to it, the device serving to connect the completed windshield wiper to a wiper arm 29 indicated by phantom lines. The finished beam blade windshield wiper is identified in FIG. 1 as 30.

In a special embodiment of the device 1, linear positioning means not shown can be furnished for both the third support point 8 and for the fourth support point 17, with the help of which these support points 8 and 17 can be positioned in the direction of spring strip travel 12. This adjustability of the support points 8 and 17, or their assigned rollers 11 and 18, is represented symbolically in FIG. 1 by double arrows 32 and 33. For example, the lever arms operant during bending and/or reverse bending can thereby be adjusted and varied, especially during the bending process.

The method according to the invention works as follows:

The spring strip 2 is fed to the device 1 following the straightening performed in the straightening station 1, wherein the four support points 6, 7, 8 and 17 follow spaced apart in succession and alternately impinge on the one or the other side of the spring strip 2. The third support point 8 creates a curvature in the individual spring strip 3 with a predetermined degree of bending, or radius of curvature. The fourth support point 17 creates a reverse curvature, whose degree or radius of reverse curvature is smaller than that of the preceding curvature at the third support point 8. As a result of this reverse bending, residual stresses which were induced during the preceding bending process, can be alleviated. With the help of the adjustable third and fourth support points 8 and 17, through appropriate control of the actuators 13 and 19 by the control unit 15 by means of suitable programs, changing material thicknesses in the direction of spring strip travel 12 within the spring strip section 3 and/or radii of curvature which change in the direction of spring strip travel 12 and/or radii of reverse curvature can be taken into account. In this way, relatively complex bending procedures can be carried out in a continuous bending process.

After cutting in the cutting station 20 and before conjoining the separated spring strip section 3 to the wiping element 24, the curved spring strip section 21 can be subjected to heat treatment which can also contribute to the alleviation of residual stresses. Attachment of the wiping element 24 and the connecting device 28 can be performed thereafter.

The first and second support points 6 and 7 are certainly both configured as stationary support points, but it is clear that these support points 6 and 7 can also be adjusted specifically to calibrate or to set the particular material thickness of the material stock. During the continuous bending process, however, they remain locked in place, in contrast to the third and fourth support points 8 and 17.

An additional advantage of the arrangement of the adjustable support points, third and fourth support points 8 and 17, in accordance with the invention can be found in the fact that the cutting unit 20 can be positioned after the bending unit 5 and the reverse bending unit 16, whereby the cutting procedure, as an engineering process, is detached from the bending procedures.

It is clear that with the help of the control unit 15 and the adjustable support points 8 and 17, in addition to taking changing material thicknesses and/or changing bending and reverse bending radii into account, it is further possible to intervene in the bending procedure and the reverse bending procedure to make permanent corrections. A sensor mechanism for this purpose is not shown here.

What is claimed is:

1. A method for the production of curved spring strip sections comprising the steps of:
   bending a spring strip formed of spring strip sections disposed sequentially to form one piece between three support points
   spaced apart in the direction of spring strip travel and impinging alternately in sequence on one of the two sides of the spring strip;
   reverse bending at a subsequent fourth support point by a comparatively lesser degree of curvature in the opposite direction;
   controlling a spring strip section subsequently cut from the spring strip;
   configuring one of the three support points for spring strip bending and the fourth support point for spring strip reverse bending to be adjustable perpendicular to the spring strip in the direction of strip thickness;
   controlling perpendicular adjustments of the support points relative to the spring strip by predetermined programs, which takes into account at least one of changing material thickness within the spring strip sections in the direction of spring strip travel and changing radii of curvature and radii of reverse curvature in the direction of spring strip travel; and
   configuring the third support point adjacent the fourth support point to be adjustable perpendicular to the spring strip in the direction of strip thickness.

2. The method and as set forth in claim 1 further comprising the step of:
   configuring one of at least the third support point for spring strip bending and the fourth support point for spring strip reverse bending to be positionable in the direction of spring strip travel.

3. The method as set forth in claim 1, further comprising the step of:
   locating a cutting edge after the fourth support point for spring strip reverse bending in the direction of spring strip travel past which a blade passes to detach the spring strip sections.

4. The method as set forth in claim 1 further comprising the steps of:
- conjoining the spring strip section to a flexible rubber wiping element, and
- attaching a connecting device for a wiper arm.

5. A device for the production of curved spring strip sections
- a bending unit including first, second and third spaced apart support points through which a spring strip formed from the spring strip sections disposed one behind the other to form one piece can be drawn such that the support points in the direction of spring strip travel of the spring strip alternately in sequence impinge on the one and the other side of the strip, wherein one of the three support points is configured to be adjustable to set a radius of curvature perpendicular to the spring strip
- a reverse bending unit subsequent to the bending unit in the direction of spring strip travel
- the reverse bending unit including a fourth support point acting on the same side of the spring strip as the second, support point of the bending unit, the fourth support point being adjustable to establish a reverse radius of curvature perpendicular to the spring strip
- a cutting unit for detaching the spring strip section which has passed through the bending unit and the reverse bending unit from the spring strip; and
- the third support point of the bending unit adjacent the fourth support point being configured to be adjustable perpendicular to the spring strip in the direction of strip thickness.

6. The device as set forth in claim 5, further comprising:
- linear positioning means for the third support point for spring strip bending and for the fourth support point for reverse spring strip bending, with which one of the third support point and/or and the fourth support point can be positioned in the direction of spring strip travel.

7. The unit as set forth in claim 5, wherein the cutting device is located subsequent to the reverse bending unit respective to the direction of spring strip travel, the cutting unit having a cutting edge across which a blade is passed to detach the spring strip section.

* * * * *